(12) United States Patent
Yu et al.

(10) Patent No.: US 9,356,744 B2
(45) Date of Patent: May 31, 2016

(54) METHOD FOR DEACTIVATED SECONDARY CELL MEASUREMENT AND COMMUNICATIONS APPARATUS UTILIZING THE SAME

(71) Applicant: MediaTek Inc., Hsin-Chu (TW)

(72) Inventors: Chia-Hao Yu, Yilan (TW); Ju-Ya Chen, Kaohsiung (TW); Kuan-Lin Chen, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/468,526

(22) Filed: Aug. 26, 2014

(65) Prior Publication Data
US 2015/0223087 A1    Aug. 6, 2015

Related U.S. Application Data (60) Provisional application No. 61/936,408, filed on Feb. 6, 2014.

(51) Int. Cl.
*H04M 3/00* (2006.01)
*H04L 5/00* (2006.01)

(52) U.S. Cl.
CPC .. *H04L 5/00* (2013.01); *Y02B 60/50* (2013.01)

(58) Field of Classification Search
CPC ................................................... H04W 24/08
USPC ................................................ 455/418, 553
See application file for complete search history.

(56) References Cited

U.S. PATENT DOCUMENTS

| | | | |
|---|---|---|---|
| 9,113,450 B2 * | 8/2015 | Pelletier | H04W 74/04 |
| 2011/0267955 A1 * | 11/2011 | Dalsgaard | H04W 24/00 370/241 |
| 2013/0100846 A1 * | 4/2013 | Park | H04W 24/10 370/252 |
| 2013/0215736 A1 * | 8/2013 | Han | H04L 5/001 370/216 |
| 2014/0050255 A1 * | 2/2014 | Azizi | H04L 27/2666 375/219 |

FOREIGN PATENT DOCUMENTS

| | | |
|---|---|---|
| CN | 102448107 | 5/2012 |
| WO | WO 2012/040912 | 4/2012 |
| WO | WO 2012/136592 | 10/2012 |

* cited by examiner

*Primary Examiner* — Qutbuddin Ghulamali
(74) *Attorney, Agent, or Firm* — McClure, Qualey & Rodack, LLP (57) ABSTRACT

A method for deactivated secondary Component Carrier (CC) measurement in a communications apparatus providing wireless communications services via a first CC in a wireless network includes: determining a switch timing to perform bandwidth extension or frequency adjustment required for performing a deactivated secondary CC measurement; extending an operation bandwidth or adjusting a center frequency of at least one signal processing component included in the communications apparatus at the switch timing, wherein an operation band defined by the operation bandwidth and the center frequency of the signal processing component covers at least a bandwidth of the secondary CC; and performing the deactivated secondary CC measurement after extending the operation bandwidth or adjusting the center frequency. The secondary CC is not able to perform data transmission or reception during a deactivated state.

20 Claims, 8 Drawing Sheets

METHOD FOR DEACTIVATED SECONDARY CELL MEASUREMENT AND COMMUNICATIONS APPARATUS UTILIZING THE SAME

CROSS REFERENCE TO RELATED APPLICATIONS

This application claims the benefit of U.S. Provisional Application No. 61/936,408 filed 2014 Feb. 6 and entitled "Method for Power-efficient Deactivated SCC Measurement". The entire contents of which are hereby incorporated by reference.

BACKGROUND OF THE INVENTION

1. Field of the Invention

The invention relates to method for Power-efficient Deactivated SCC measurement with no PCC interruption.

2. Description of the Related Art

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard and can be used for home networks, mobile phones, and video games, to provide a high-frequency wireless local area network. The LTE (Long Term Evolution) and the LTE-Advanced evolved from the LTE is a 4G mobile communications system, which provides a high-speed data transmission over the 2G and 3G systems.

The LTE Advanced introduces a mechanism for aggregating up to five LTE carriers to extend its maximum transmission bandwidth up to 100 MHz. The mechanism is termed Carrier Aggregation (CA) in LTE. In CA, two or more Component Carriers (CCs) are aggregated in order to provide wider transmission bandwidths up to 100 MHz. The CA can be applied to aggregate both contiguous and non-contiguous CCs. It is also possible to configure a User Equipment (UE) to aggregate a different number of CCs originating from the same evolved Node B (eNB) and of possibly different bandwidths in the uplink (UL) and the downlink (DL). The UE may simultaneously receive or transmit radio frequency (RF) signals via one or multiple CCs depending on its capabilities. A record of configured set of CCs aggregated for signal and data transmission may be maintained by both the UE and the eNB for keeping information regarding to the configured CCs for the UE. There is generally one Primary Cell (PCell) (or, Primary Component Carrier (PCC)) and one or more Secondary Cell (SCell) (or, Secondary Component Carrier (SCC)) in a configured set of CCs.

The current LTE standard allows no PCell interruption for deactivated SCell measurement requirement when the measurement cycle measCycleSCell is short (less than 640 ms). To meet this no PCell interruption requirement, for the UE with one or more RF components shared by the aggregated CCs, the bandwidth of the RF components should be extended to a level capable of receiving and processing the RF signals of the aggregated CCs all the time. However, it is not power efficient for the UE to extend the bandwidth of the RF components so wide all the time.

Therefore, a novel method for deactivated Scell measurement is required.

BRIEF SUMMARY OF THE INVENTION

Communications apparatuses and method for deactivated secondary Component Carrier (CC) measurement are provided. An exemplary embodiment of a communications apparatus providing wireless communications services via a first CC configured by a base station in a wireless network comprises an antenna module, a signal processing device and a processor. The antenna module comprises at least one antenna for receiving a plurality of Radio Frequency (RF) signals from the wireless network. The signal processing device is coupled to the antenna module and comprises a plurality of signal processing components for processing the RF signals. At least one signal processing component processes the RF signals according to an operation band defined by an operation bandwidth and a center frequency. The processor is coupled to the signal processing device, determines a switch timing for performing bandwidth extension and frequency adjustment required for performs a deactivated secondary CC measurement, extending the operation bandwidth and adjusting the center frequency of the signal processing component at the switch timing, and performing the deactivated secondary CC measurement, wherein the operation band of the signal processing component covers both a bandwidth of the first CC and a bandwidth of the secondary CC after extending the operation bandwidth and adjusting the center frequency. The secondary CC is not able to perform data transmission or reception during a deactivated state.

An exemplary embodiment of a method for deactivated secondary Component Carrier (CC) measurement in a communications apparatus providing wireless communications services via a first CC in a wireless network comprising: determining a switch timing to perform bandwidth extension or frequency adjustment required for performing a deactivated secondary CC measurement; extending an operation bandwidth or adjusting a center frequency of at least one signal processing component comprised in the communications apparatus at the switch timing, wherein an operation band defined by the operation bandwidth and the center frequency of the signal processing component covers at least a bandwidth of the secondary CC; and performing the deactivated secondary CC measurement after extending the operation bandwidth or adjusting the center frequency. The secondary CC is not able to perform data transmission or reception during a deactivated state.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
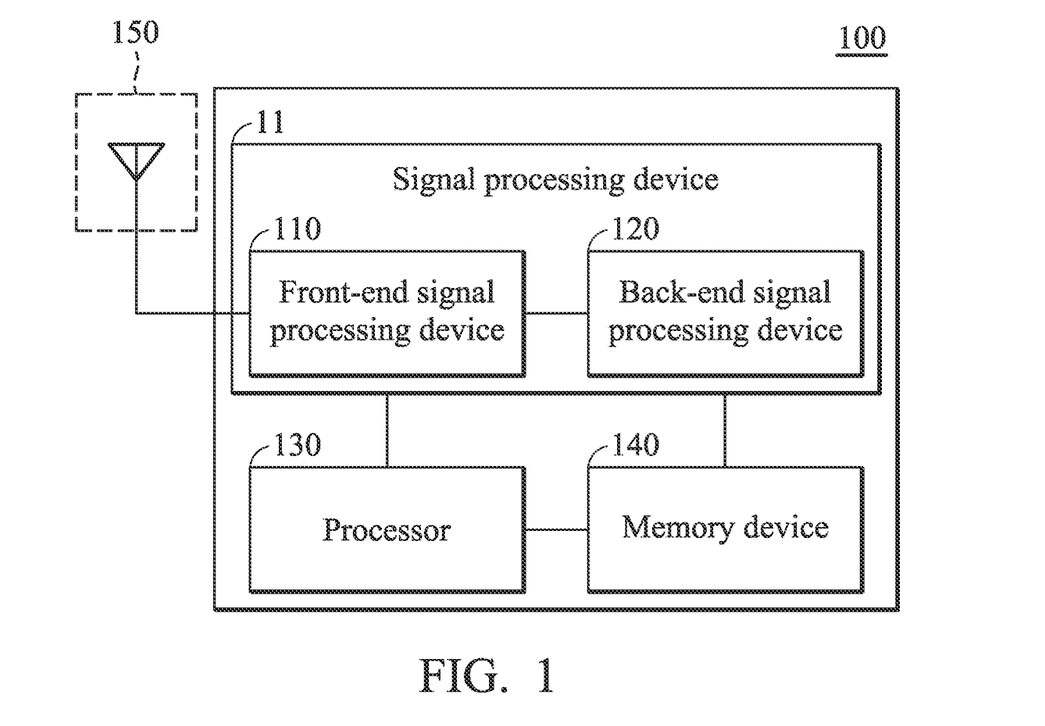
FIG. 1 is a block diagram of a communications apparatus according to an embodiment of the invention.

FIG. 1 is a block diagram of a communications apparatus according to an embodiment of the invention. The communications apparatus 100 may be a notebook, a cellular phone, a receiver, a personal digital assistant, a tablet computer, or another such device. The communications apparatus 100 may comprise at least a signal processing device 11, a processor 130, a memory device 140, and an antenna module 150 comprising at least one antenna. Note that, in order to clarify the concept of the invention, FIG. 1 presents a simplified block diagram in which only the elements relevant to the invention are shown. However, the invention should not be limited to what is shown in FIG. 1.

The signal processing device 11 may receive RF signals via the antenna module 150 and process the received RF signals to convert the received RF signals to baseband signals, and may further process the baseband signals to obtain information or data transmitted by a serving base station For example, the serving base station may be a serving evolved Node B (eNB) in an LTE wireless network. The signal processing device 11 may also process uplink data to be transmitted to the serving eNB as the baseband signals and convert the baseband signals to RF signals to be transmitted to the serving eNB.

The processor 130 may control the operations of the signal processing device 11 and the memory device 140. According to an embodiment of the invention, the processor 130 may also be arranged to execute the program codes of the software module(s) of the signal processing device 11. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s). The memory device 140 may store the software and firmware program codes, system data, user data, etc. of the communications apparatus 100.

According to an embodiment of the invention, the signal processing device 11, the processor 130 and the memory device 140 may be collectively regarded as a radio module capable of communicating with the serving eNB in the LTE wireless network to provide wireless communications services in compliance with the LTE standard. Note that, in some embodiments of the invention, the communications apparatus 100 may further be extended to comprise more than one antenna and/or more than one radio module, and the invention should not be limited to what is shown in FIG. 1.

According to an embodiment of the invention, the signal processing device 11 may comprise a front-end signal processing device 110 and a back-end signal processing device 120, and each may comprise a plurality of signal processing components. The signal processing components may be hardware devices, firmware modules and/or software modules configured for performing radio frequency (RF) signal processing, intermediate frequency (IF) signal processing and/or baseband signal processing.

The front-end signal processing device 110 may be configured for performing signal processing on the RF signals received from the antenna module 150. The signal processing performed by the front-end signal processing device 110 may comprise RF signal processing and/or IF signal processing and may further comprise baseband signal processing (when the mixer(s) for down-converting the RF or IF signals to baseband signals is/are implemented in the front-end signal processing device 110). The back-end signal processing device 120 may be configured for performing signal processing on the IF or baseband signals received from the front-end signal processing device 110. Note that the front-end signal processing device 110 may perform signal processing in the analog domain or in both the analog and digital domains (for example, when the analog to digital converter (ADC) is implemented in the front-end signal processing device 110), and the invention should not be limited to either case. Similarly, the back-end signal processing device 120 may perform signal processing in the digital domain or in both the analog and digital domains (for example, when the ADC is implemented in the back-end signal processing device 120), and the invention should not be limited to either case.

According to an embodiment of the invention, when the communications apparatus 100 supports Carrier Aggregation (CA), the eNB in the LTE wireless network may configure two or more Component Carriers (CCs) for the communications apparatus 100 and the CCs may be aggregated in order to provide wider transmission bandwidths. Among the configured CCs, one is a Primary Component Carrier (PCC) (or, the Primary Cell (PCell)) and the remaining(s) are the Secondary Component Carrier(s) (SCC) (or, the Secondary Cell (SCell)). When an SCell is configured but not activated, the SCell is a deactivated SCell. In deactivated state, the SCell is not able to perform data transmission or reception and the communication apparatus 100 performs SCell measurement for monitoring SCell channel conditions. The SCell measurement is required to fulfill a set of specified measurement requirements.

The current LTE standard allows no PCell interruption for deactivated SCell measurement when the measurement cycle measCycleSCell is short (less than 640 ms). Therefore, when one or more signal processing components in the signal processing device 11 is/are shared by aggregated CCs, which usually happens in an intra-band CA scenario, it implies that the operation bandwidth(s) of the shared signal processing component(s) should be extended wide enough all the time to cover at least the bandwidth requirements of both the PCC and the SCC, such that the PCell interruption is not experienced.

However, when the operation bandwidth(s) of the shared signal processing component(s) is/are extended wider all the time, the power consumption would be increased substantially. To solve this problem, several methods for power-efficient deactivated SCell measurement without causing any PCell interruption are proposed.

According to an embodiment of the invention, different from conventional designs, the processor 130 dynamically adjust an operation band of at least one signal processing component comprised in the signal processing device 11 on an as-needed basis before performing the deactivated SCC measurement, such that the operation band of the at least one signal processing component is adjusted to further cover a bandwidth of the deactivated SCell only when the deactivated SCell measurement is required. Since it takes a certain time to adjust the operation band of the signal processing component, in the embodiment of the invention, the processor 130 may determine a switch timing for performing operation band adjustment/reconfiguration. The switch timing may be selected when, for example, no PCell traffic is about to come, such that no PCell interruption would occur during the operation band adjustment/reconfiguration Note that since an operation band is defined by an operation bandwidth and a center frequency, in the embodiment, operation band adjustment/reconfiguration may comprise bandwidth adjustment/reconfiguration and center frequency adjustment/reconfiguration.

According to an embodiment of the invention, the processor 130 may determine a switch timing for performing bandwidth and/or frequency adjustment required for performing a deactivated SCC measurement, adjust the operation bandwidth and/or the center frequency of the signal processing component at the switch timing, such that the operation band of the signal processing component covers at least a bandwidth of the SCC or covers both bandwidths of the PCC and the SCC, and perform the deactivated SCC measurement via the signal processing device 11 after the bandwidth and/or frequency adjustment.

According to a first embodiment of the invention, the processor 130 may determine the switch timing according to a Physical Downlink Control Channel (PDCCH) blind decoding result of a current sub-frame. To be more specific, the processor 130 may start extending the operation bandwidth and adjusting the center frequency of the signal processing component when the PDCCH blind decoding result indicates that there is no downlink scheduling for the communications apparatus 100 in the current sub-frame, such that the operation band of the signal processing component covers both a bandwidth of the PCC and a bandwidth of the SCC. Note that the adjustment of the operation bandwidth and the center frequency should be finished before the end of this sub-frame so that it does not impact the data reception in the subsequent sub-frame.

Figure 2:
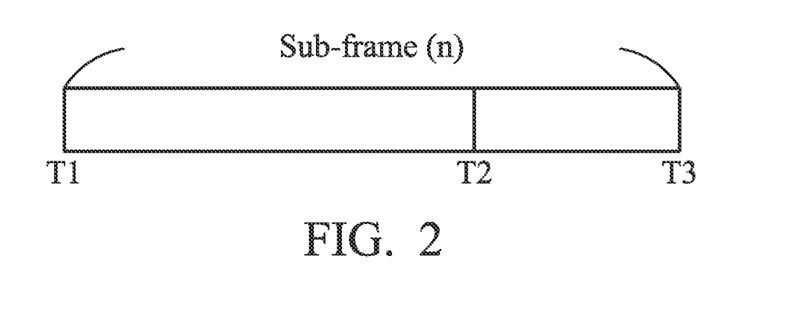
FIG. 2 is an exemplary timing diagram showing the time to perform bandwidth adjustment/reconfiguration and frequency adjustment/reconfiguration in a sub-frame according to the first embodiment of the invention.

FIG. 2 is an exemplary timing diagram showing the time to perform bandwidth adjustment/reconfiguration and frequency adjustment/reconfiguration in a sub-frame according to the first embodiment of the invention. Suppose that PDCCH blind decoding is performed from time T1 and the PDCCH blind decoding result is obtained at time T2. When the PDCCH blind decoding result indicates that there is no downlink scheduling for the communications apparatus 100 in the current sub-frame (n), the processor 130 can start extending the operation bandwidth and adjusting the center frequency of the signal processing component after time T2, and should finish the adjustment/reconfiguration before time T3 to prevent PCell interruption. In FIG. 2, T1 indicates the start of the current sub-frame. In reality, PDCCH decoding can start only after complete reception of whole control region, which is a few OFDM symbols after the start of the current sub-frame. The indication of T1 here is used for illustration only.

Note that in the first embodiment of the invention, PCell data reception and deactivated SCell measurement can be performed at the same time by utilizing the same signal processing device 11 after the bandwidth and the carrier frequency have been adjusted to cover both the PCell and SCell. After finishing the scheduled deactivated SCell measurement, the processor 130 can utilize similar opportunity for reducing the bandwidth to simply fulfill the need for PCell data reception for the sake of power saving. With such dynamic control on the signal processing bandwidth, better power efficiency is achieved since one does not need to remain the signal processing bandwidth wide all the time.

According to a second embodiment of the invention, the processor 130 may determine the switch timing according to a Discontinuous Reception (DRX) cycle configured for the communications apparatus 100 in LTE RRC_Connected mode. To be more specific, the processor 130 may extend the operation bandwidth and adjust the center frequency of the signal processing component in a DRX off duration, such that the operation band of the signal processing component covers both bandwidth of the PCC and the SCC. Note that in some embodiments of the invention, besides extending the operation bandwidth, the processor 130 may also adjust the operation bandwidth and/or the center frequency of the signal processing component in the DRX off duration, such that the operation band of the signal processing component covers at least the bandwidth of the SCC in the DRX off duration.

Note that when DRX is configured and activated, the DRX off duration may be utilized as the autonomous gap for the communications apparatus 100 to perform the bandwidth and carrier frequency adjustment. In such autonomous gap, there is no PCell traffic to be expected, and thus, no PCell interruption would occur. Note that in the second embodiment of the invention, the processor 130 can further decrease/adjust the operation bandwidth and/or adjust the center frequency of the signal processing component before an end of a DRX off duration, such that the operation band of the signal processing component is adjusted to cover only the bandwidth and the carrier frequency of the PCell before the end of the DRX off duration. In this manner, the power-efficient deactivated SCell measurement without causing PCell/PCC interruption can be achieved.

According to a third embodiment of the invention, the processor 130 may determine the switch timing according to a measurement gap pattern configured by the serving eNB. To be more specific, the processor 130 may extend the operation bandwidth and adjust the center frequency of the signal processing component in a measurement gap not utilized by any LTE measurement object, such that the operation band of the signal processing component covers both bandwidth of the PCC and the SCC. That is, in this embodiment, the deactivated SCC measurement is treated and scheduled as an independent inter-frequency measurement. Note that in some embodiments of the invention, besides extending the operation bandwidth, the processor 130 may also adjust the operation bandwidth and/or the center frequency of the signal processing component in the measurement gap not utilized by any LTE measurement object, such that the operation band of the signal processing component covers at least the bandwidth of the SCC.

Figure 3:
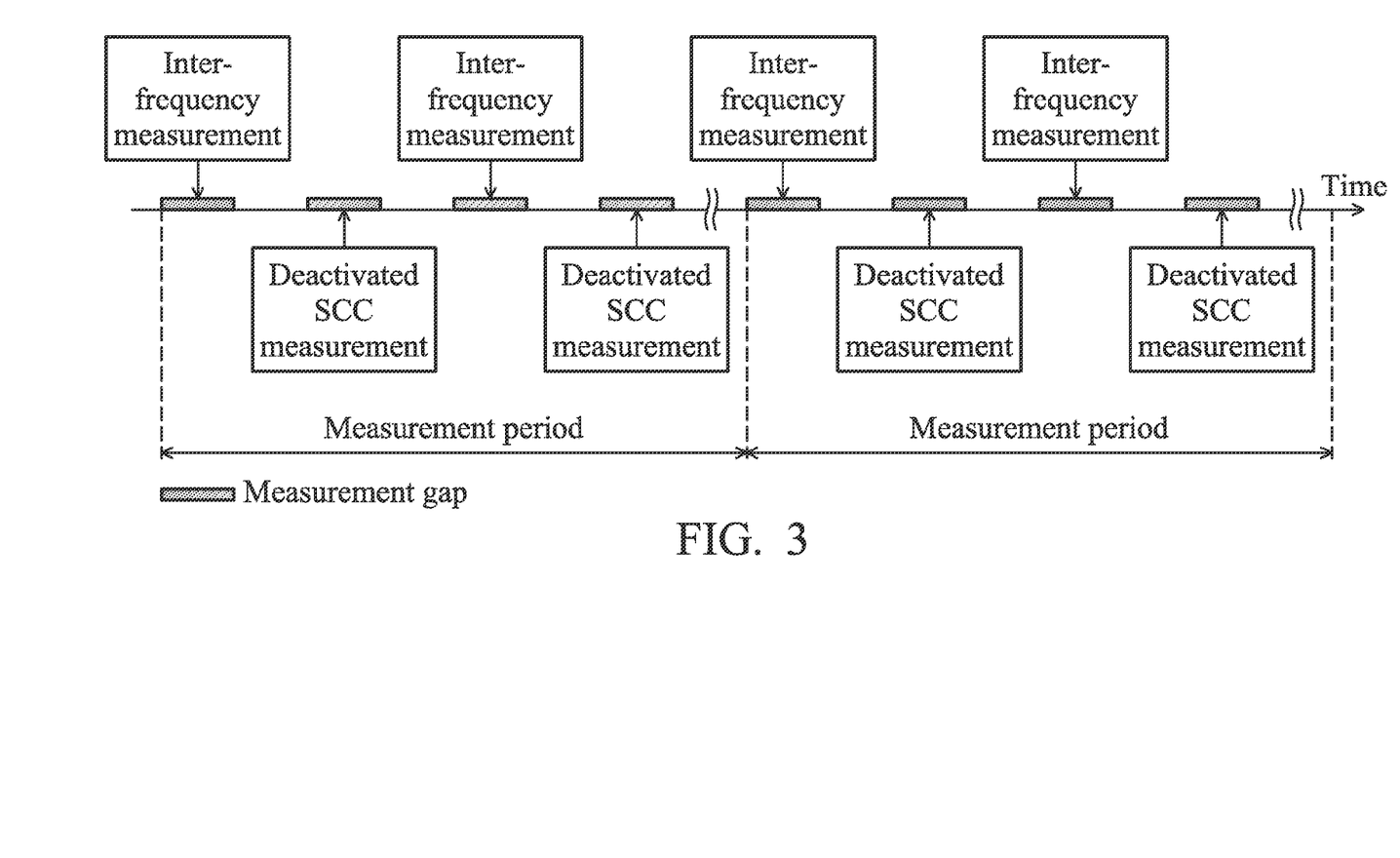
FIG. 3 is an exemplary timing diagram showing the time to perform bandwidth adjustment/reconfiguration and/or frequency adjustment/reconfiguration in the measurement gaps according to the third embodiment of the invention.

FIG. 3 is an exemplary timing diagram showing the time to perform bandwidth adjustment/reconfiguration and/or frequency adjustment/reconfiguration in the measurement gaps according to the third embodiment of the invention. As shown in FIG. 3, the processor 130 may use some measurement gaps to perform inter-frequency measurement and use some measurement gaps to perform the deactivated SCell measurement. In the measurement gap, there is no PCell traffic and thus there will be no PCell interruption. Note that in the third embodiment of the invention, the processor 130 can further decrease/adjust the operation bandwidth and/or adjust the center frequency of the signal processing component before an end of the measurement gap, such that the operation band of the signal processing component is adjusted to cover only the bandwidth of the PCC before the end of the measurement gap. In this manner, the power-efficient deactivated SCC measurement without causing PCell/PCC interruption can be achieved within the utilized measurement gap.

According to a fourth embodiment of the invention, the processor 130 may determine the switch timing according to a measurement gap pattern configured by the serving eNB for measuring one or more measurement objects. To be more specific, the processor 130 may extend the operation bandwidth and adjust the center frequency of the signal processing component between two measurement gaps, such that the operation band of the signal processing component covers both bandwidth of the PCC and the SCC.

Figure 4:
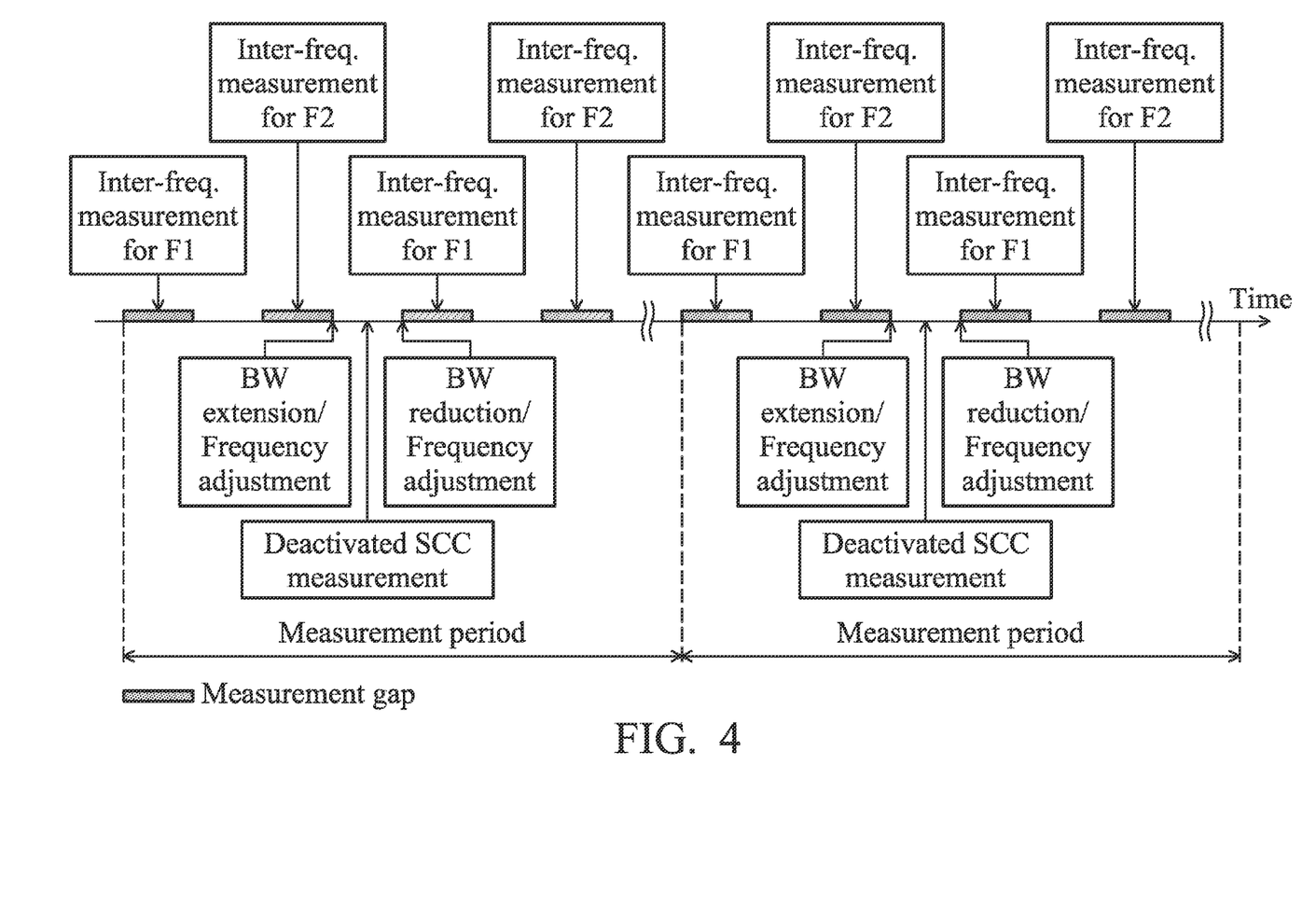
FIG. 4 is an exemplary timing diagram showing the time to perform bandwidth adjustment/reconfiguration and frequency adjustment/reconfiguration between two measurement gaps according to the fourth embodiment of the invention.

FIG. 4 is an exemplary timing diagram showing the time to perform bandwidth adjustment/reconfiguration and frequency adjustment/reconfiguration between two measurement gaps according to the fourth embodiment of the invention. As shown in FIG. 4, the processor 130 may use the first measurement gap to perform inter-frequency measurement for frequency F1 (inter-freq. measurement object for F1) and use the second measurement gap to perform inter-frequency measurement for frequency F2 (inter-freq. measurement object for F2). At the second measurement gap for frequency F2, the processor 130 can extend the operation bandwidth (BW extension) and adjust the center frequency of the signal processing component (frequency adjustment), such that the operation band of the signal processing component covers bandwidth for both the PCC and the SCC, and then perform the deactivated SCC measurement at its convenience time. Note that the precise timing for bandwidth and center frequency adjustment within the concerned measurement gap is dependent on implementation. In one preferred embodiment, the switch timing takes place after the inter-frequency measurement on F2 is finished, but before the end of the concerned measurement gap (such as, an ending part of the second measurement gap for frequency F2 in this example). Before a beginning of the third measurement gap utilized for performing inter-frequency measurement for frequency F1, the processor 130 can decrease the operation bandwidth (BW reduction) and adjust the center frequency of the signal processing component (frequency adjustment), such that the operation band of the signal processing component covers only a bandwidth of the frequency F1. In this manner, the power-efficient deactivated SCC measurement without causing PCell interruption can be achieved. Note that the precise timing for bandwidth and carrier frequency adjustment within the concerned measurement gap is dependent on implementation. In one preferred embodiment, the switch timing takes place before the inter-frequency measurement on F1 during the third measurement gap is performed, but after the start of the third measurement gap (such as, utilizing a starting part of the third measurement gap in this example).

According to a fifth embodiment of the invention, the processor 130 may determine the switch timing according to a Channel Quality Indicator (CQI) reporting period. To be more specific, the processor may report a predefined CQI value for indicating a wireless channel condition not suitable for communication and extend the operation bandwidth and/or adjust the center frequency of the signal processing component after reporting the predefined CQI value to the serving eNB. For example, the processor may report a value of 0 (that is, Out-Of-Range, OOR) for the CQI to the serving eNB, and extend the operation bandwidth and/or adjust the center frequency of the signal processing component after reporting the value of 0 for the CQI to the serving eNB, such that the operation band of the signal processing component covers bandwidth of both the PCell and the SCell. Note that in some embodiments of the invention, besides extending the operation bandwidth, the processor 130 may also adjust the operation bandwidth and/or the center frequency of the signal processing component after reporting the value of 0 for the CQI to the serving eNB, such that the operation band of the signal processing component covers at least the bandwidth of the SCell after reporting the value of 0 for the CQI to the Serving eNB.

According to an embodiment of the invention, the CQI=0 represents an Out Of Range (OOR) condition, and the CQI may be reported to the wireless network through the uplink control or shared channel. Therefore, by intentionally reporting CQI=0, another autonomous gap can be created for deactivated SCC measurement.

Figure 5:
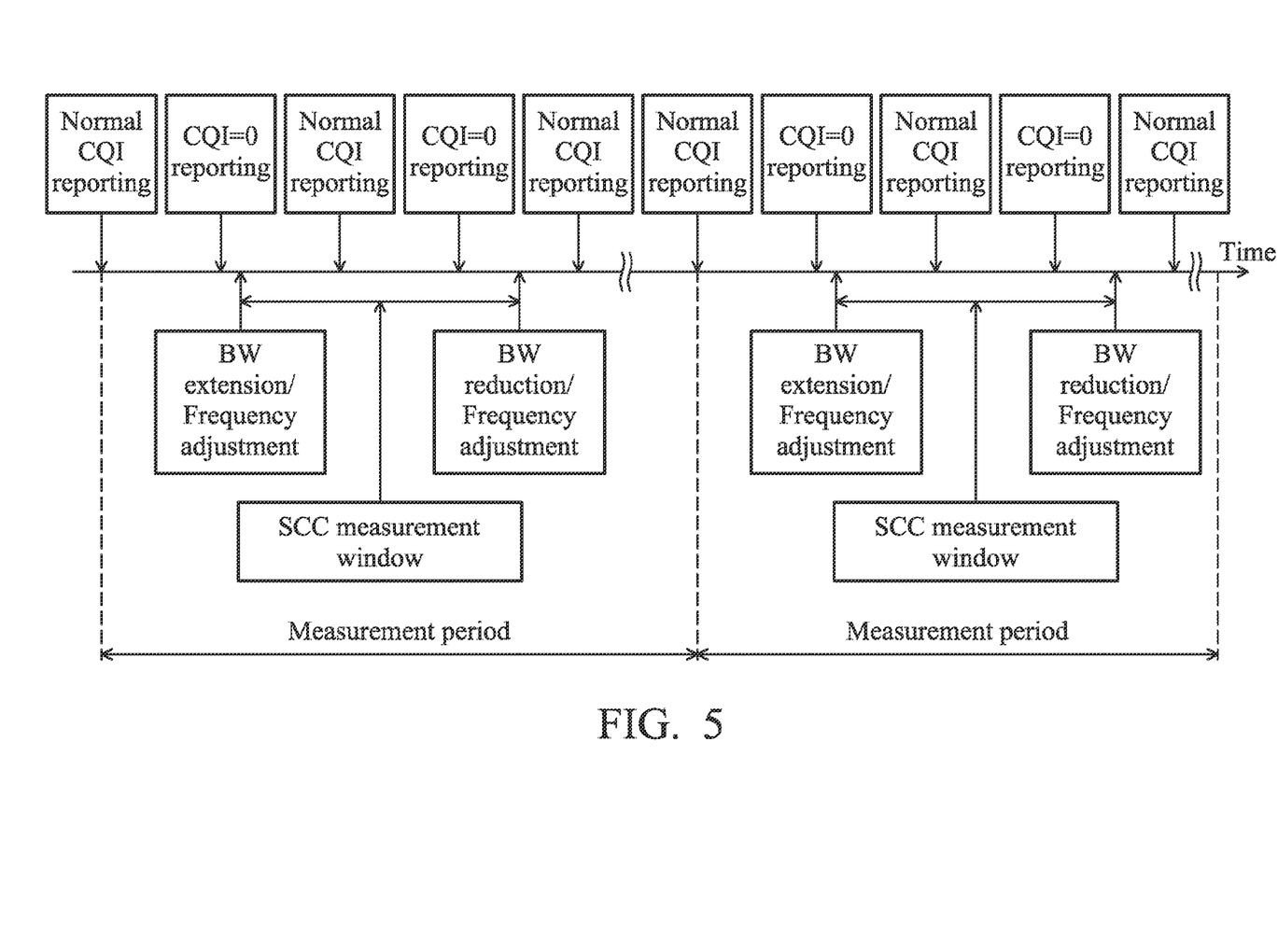
FIG. 5 is an exemplary timing diagram showing the time to perform bandwidth adjustment/reconfiguration and/or frequency adjustment/reconfiguration after reporting CQI=0 according to the fifth embodiment of the invention.

FIG. 5 is an exemplary timing diagram showing the time to perform bandwidth adjustment/reconfiguration and/or frequency adjustment/reconfiguration after reporting CQI=0 according to the fifth embodiment of the invention. When there is no need to perform deactivated SCC measurement, the processor 130 performs normal CQI reporting based on realistic channel condition. That is, the processor 130 reports a value based on its measurement (which is usually a non-zero value) for the CQI to the serving eNB in the LTE wireless network. However, when the deactivated SCC measurement is about to be performed, the processor 130 intentionally reports CQI=0 to the serving eNB in the LTE wireless network, such that the serving eNB would intend not to schedule any uplink and downlink traffic after receiving CQI=0. Therefore, after reporting CQI=0, the processor 130 can perform bandwidth adjustment/reconfiguration and/or frequency adjustment/reconfiguration, and then perform the deactivated SCC measurement. Normal CQI reporting is performed after the processor 130 finishes bandwidth adjustment/reconfiguration and/or frequency adjustment/reconfiguration. As of now, deactivated SCell measurement can be performed at any convenience time within the SCC measurement window. After the deactivated SCell measurement is completed, CQI=0 is again reported before the processor 130 may further decrease/adjust the operation bandwidth and/or adjust the center frequency of the signal processing component, such that the operation band of the signal processing component covers a bandwidth of the PCC. Then, the processor 130 can report a normal CQI value (which is usually a non-zero value) to the serving eNB in the LTE wireless network, so as to resume the normal uplink and downlink traffic transmission. In this manner, the power-efficient deactivated SCC measurement without causing PCell interruption can be achieved. The embodiments as discussed above are applicable when the communications apparatus 100 supports intra-band CA. When the communications apparatus 100 supports intra-band CA, one or more signal processing components in the signal processing device 11 may be shared by aggregated CCs.

Figure 6:
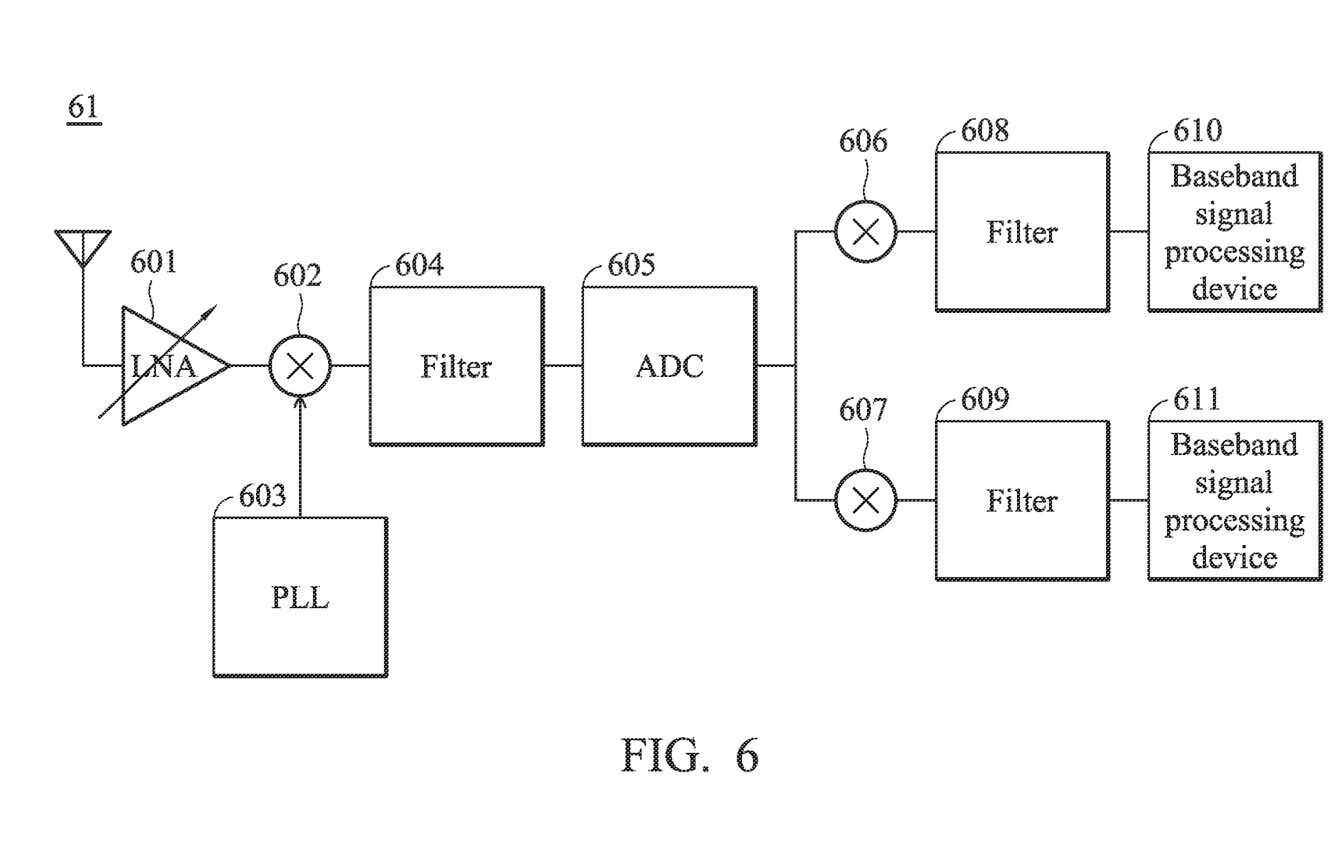
FIG. 6 shows an exemplary block diagram of the signal processing components comprised in the signal processing device according to an embodiment of the invention.

FIG. 6 shows an exemplary block diagram of the signal processing components comprised in the signal processing device according to an embodiment of the invention. The signal processing device 61 may comprise a low noise amplifier (LNA) 601 for amplifying the RF signals, a mixer 602 for frequency down-converting the amplified RF signals to IF or baseband signals according to an oscillating frequency provided by a phase locked loop (PLL) 603, and a filter for filtering the IF or baseband signals. The signal processing device 61 may further comprise an analog to digital converter (ADC) 605 for converting the IF or baseband signals from analog to digital domain. In the embodiment, the signal processing components shared by aggregated CCs may comprise the LNA 601, the mixer 602, the PLL 603, the filter 604 and the ADC 605. In an embodiment of the invention, the shared LNA 601, PLL 603 and filter 604 may be comprised in the front-end signal processing device as shown in FIG. 1. After the ADC 605, the signal processing path may be divided into two individual branches for two individual CCs. Each signal processing branch may comprise a mixer 606/607, a filter 608/609 and a baseband signal processing device 610/611, and may be configured for one CC.

According to an embodiment of the invention, the processor 130 may perform the operation band adjustment/reconfiguration on shared signal processing components comprised in the front-end signal processing device, such as the shared LNA 601, PLL 603 and filter 604. For example, the processor 130 may perform the operation band adjustment/reconfiguration on the LNA 601 by adjusting the operation bandwidth and center frequency of the LNA 601. In another example, the processor 130 may perform the operation band adjustment/reconfiguration on the PLL 603 by adjusting a value of the divisor of the divider comprised in the PLL 603, so as to adjust the oscillating frequency provided by the PLL 603. In another example, the processor 130 may perform the operation band adjustment/reconfiguration on the filter 604 and ADC 605 by adjusting the operation bandwidth and center frequency of the filter 604 and ADC 605, so as to adjust the frequency response of the filter 604 and ADC 605.

Note that the block diagram shown in FIG. 6 is merely one of a plurality of embodiments of the invention. Therefore, the signal processing components comprised in the signal processing device should not be limited to what is shown in FIG. 6.

In a scenario in which the communications apparatus 100 supports inter-band CA, the communications apparatus 100 may comprise a plurality of signal processing component chains in the signal processing device and each may be configured for an individual CC.

Figure 7:
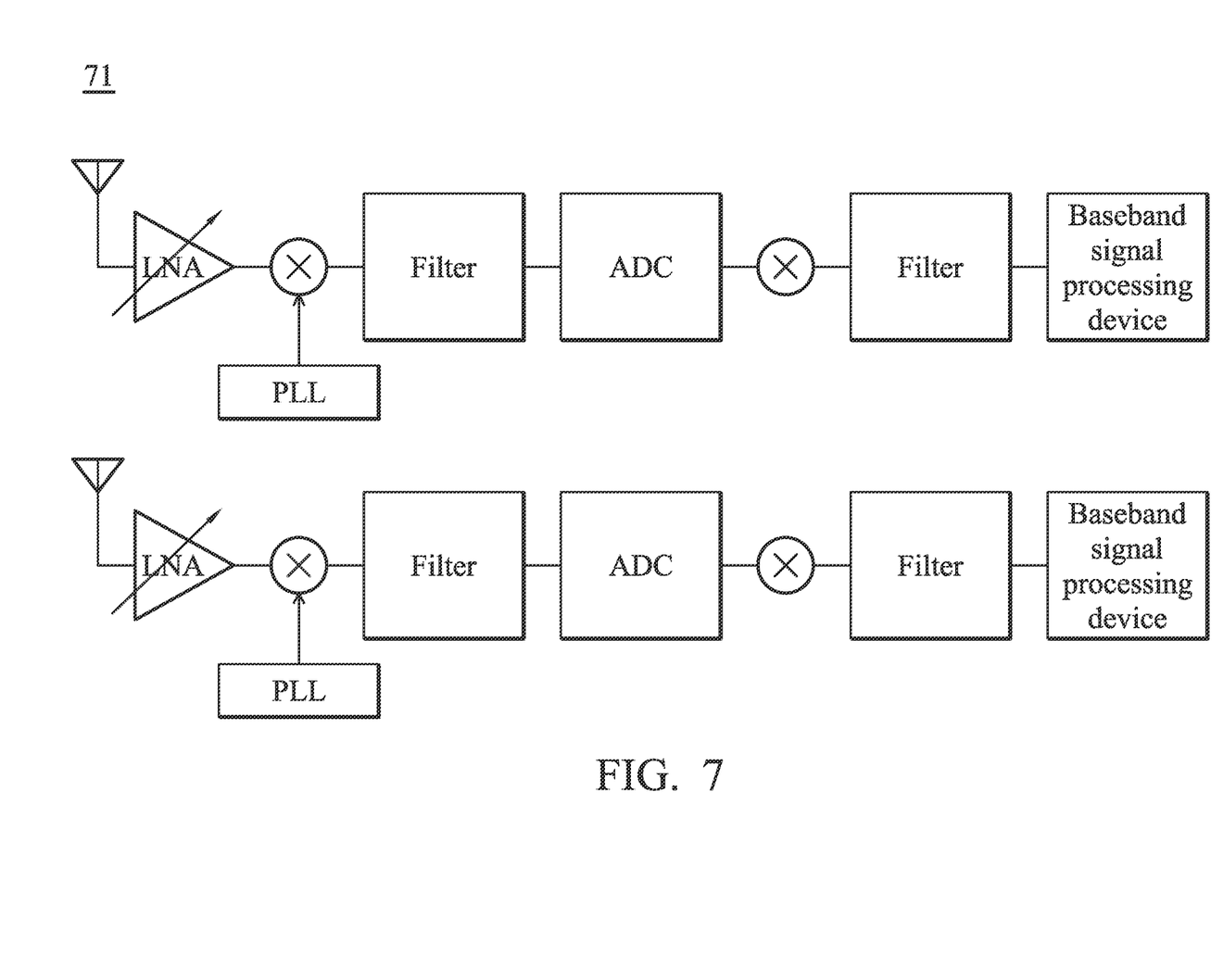
FIG. 7 shows an exemplary block diagram of the signal processing components comprised in the signal processing device according to another embodiment of the invention.

FIG. 7 shows an exemplary block diagram of the signal processing components comprised in the signal processing device according to another embodiment of the invention. As shown in FIG. 7, the signal processing device 71 may comprise two signal processing component chains, and each may be configured for an individual CC. Note that the signal processing components shown in FIG. 7 are similar to the signal processing components shown in FIG. 6. Therefore, descriptions of the signal processing components shown in FIG. 7 may be referred to in FIG. 6, and are omitted here for brevity.

According to an embodiment of the invention, for communications apparatus 100 which supports inter-band CA scenario, the PCC and the SCC may still share the same signal processing component chain in case of being applied in intra-band CA scenario. In this case, the embodiments as discussed above are all applicable to avoid causing PCell interruption while performing the deactivated SCC measurement.

According to another embodiment of the invention, for communications apparatus 100 which supports inter-band CA scenario, one signal processing component chain (hereafter called the first chain) may be configured for PCC and another signal processing component chain (hereinafter called the second chain) may be configured for SCC. In this manner, performing the deactivated SCC measurement would not cause PCell interruption, theoretically.

Apparently, it is more power efficient to dynamically turn on/off the second chain configured for the SCC which is in deactivated state. In practice, power on/off operation in one chain could temporarily affect normal operation of another chain. To avoid causing undesired interference to the signal processing components in the first chain configured for the PCC, it is preferable to turn on/off the one or more signal processing component(s) in the second chain at a proper switch timing.

According to an embodiment of the invention, the switch timing may be selected according to a DRX cycle configured for the communications apparatus 100 in a LTE RRC_Connected mode. To be more specific, the processor 130 may turn on/off the one or more signal processing component(s) in the second chain for performing the deactivated SCC measurement in a DRX off duration.

According to another embodiment of the invention, the switch timing may be selected according to a measurement gap pattern configured by the serving eNB. To be more specific, the processor 130 may turn on/off the one or more signal processing component(s) in the second chain for performing the deactivated SCC measurement in a measurement gap not utilized by any measurement object. In this way, turning on/off the one or more signal processing component(s) in the second chain configured for the SCell will not affect normal operation of PCell which utilizes the first chain since PCell does not expect any traffic during measurement gaps.

Figure 8:
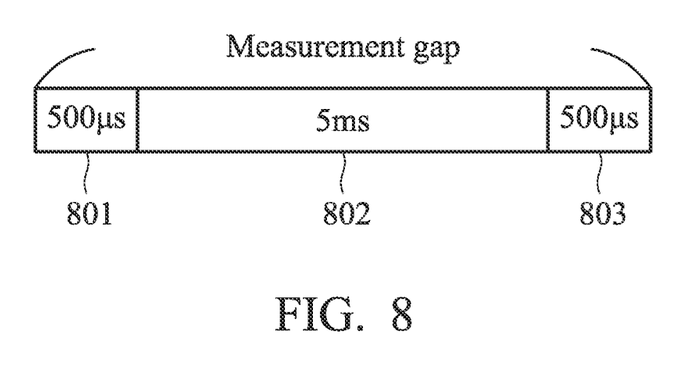
FIG. 8 shows an exemplary measurement gap according to an embodiment of the invention.

According to yet another embodiment of the invention, the processor 130 may turn on/off the one or more signal processing component(s) in the second chain for performing the deactivated SCC measurement at different measurement gaps utilized for any measurement object. This way, the turning on/off of the one or more signal processing component(s) in the second chain do not cause undesired interference to PCell data traffic. In order to avoid affecting PCell measurement activities within measurement gap, such turning on/off operation in the second chain should happen in the very beginning or the end of measurement gaps. For example, for turning on operation, it can take place in the very beginning of a measurement gap. For turning off operation, it can take place at the end of measurement gaps. As illustrated in FIG. 8, when a measurement gap utilized for a measurement object for the first chain is 6 ms, turning on the one or more signal processing component(s) in the second chain can be performed during the first 500 microseconds (labeled by 801) in the measurement gap, and turning off the one or more signal processing component(s) in the second chain can be performed during the last 500 microseconds (labeled by 803) in the measurement gap, and the deactivated SCC measurement can be performed during in the middle 5 ms (labeled by 802).

Figure 9:
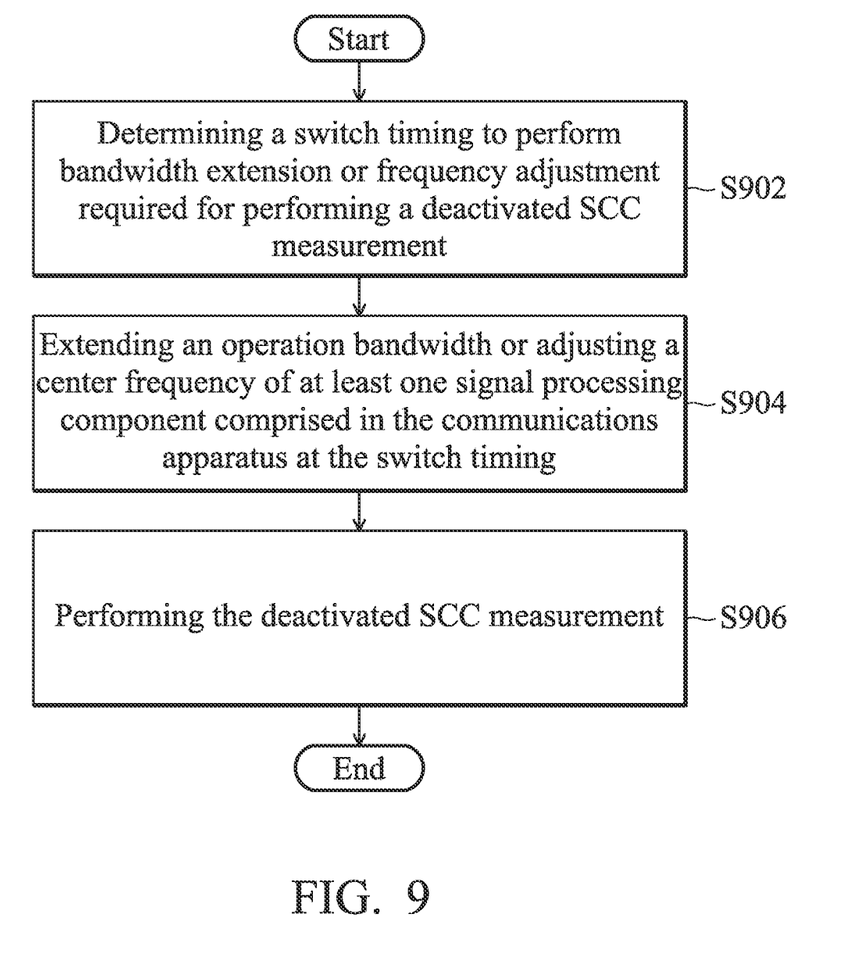
FIG. 9 is a flow chart of a method for power-efficient deactivated SCC measurement according to an embodiment of the invention.

FIG. 9 is a flow chart of a method for power-efficient deactivated SCC measurement according to an embodiment of the invention. A switch timing for a communications apparatus to perform bandwidth extension or frequency adjustment required for performing a deactivated SCC measurement is first determined (Step S902). Next, an operation bandwidth of at least one signal processing component comprised in the communications apparatus is extended or a center frequency of at least one signal processing component comprised in the communications apparatus is adjusted at the switch timing (Step S904), such that an operation band defined by the operation bandwidth and the center frequency of the signal processing component covers at least a bandwidth of the SCC. Finally, the deactivated SCC measurement is performed after extending the operation bandwidth or adjusting the center frequency (Step S906).

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus providing wireless communications services via a first Component Carrier (CC) configured by a base station in a wireless network, comprising:
   an antenna module, comprising at least one antenna for receiving a plurality of Radio Frequency (RF) signals from the wireless network;
   a signal processing device, coupled to the antenna module and comprising a plurality of signal processing components for processing the RF signals, wherein at least one signal processing component processes the RF signals according to an operation band defined by an operation bandwidth and a center frequency; and
   a processor, coupled to the signal processing device, determining a switch timing for performing bandwidth extension and frequency adjustment required for performing a deactivated Secondary CC measurement, extending the operation bandwidth and adjusting the center frequency of the signal processing component at the switch timing, and performing the deactivated secondary CC measurement, wherein the operation band of the signal processing component covers both a bandwidth of the first CC and a bandwidth of the secondary CC after extending the operation bandwidth and adjusting the center frequency, wherein the secondary CC is not able to perform data transmission or reception during a deactivated state, and wherein the processor determines the switch timing according to a Physical Downlink Control Channel (PDCCH) blind decoding result of a sub-frame, and wherein the processor starts extending the operation bandwidth and adjusting the center frequency of the signal processing component when the PDCCH blind decoding result indicates that there is no downlink scheduling for the communications apparatus in the sub-frame.

2. The communications apparatus as claimed in claim 1, wherein the processor further decreases the operation bandwidth and adjusts the center frequency of the signal processing component after performing the deactivated secondary CC measurement, and the operation band of the signal processing component covers only the bandwidth of the first CC after decreasing the operation bandwidth and adjusting the center frequency.

3. A communications apparatus providing wireless communications services via a first Component Carrier (CC) configured by a base station in a wireless network, comprising:
   an antenna module, comprising at least one antenna for receiving a plurality of Radio Frequency (RF) signals from the wireless network;
   a signal processing device, coupled to the antenna module and comprising a plurality of signal processing components for processing the RF signals, wherein at least one signal processing component processes the RF signals according to an operation band defined by an operation bandwidth and a center frequency; and
   a processor, coupled to the signal processing device, determining a switch timing for performing bandwidth extension and frequency adjustment required for performing a deactivated Secondary CC measurement, extending the operation bandwidth and adjusting the center frequency of the signal processing component at the switch timing, and performing the deactivated secondary CC measurement, wherein the operation band of the signal processing component covers both a bandwidth of the first CC and a bandwidth of the secondary CC after extending the operation bandwidth and adjusting the center frequency, wherein the secondary CC is not able to perform data transmission or reception during a deactivated state, and wherein the processor determines the switch timing according to a Discontinuous Reception (DRX) cycle, and the processor extends the operation bandwidth and adjusts the center frequency of the signal processing component in a DRX off duration.

4. The communications apparatus as claimed in claim 3, wherein the processor determines the switch timing according to a measurement gap pattern configured by the base station for measuring one or more measurement objects, and wherein the processor extends the operation bandwidth and adjusts the center frequency of the signal processing component in a measurement gap not utilized for measuring any measurement object.

5. The communications apparatus as claimed in claim 4, wherein the processor further decreases the operation bandwidth and adjusts the center frequency of the signal processing component before an end of the measurement gap, and the operation band of the signal processing component covers only the bandwidth of the first CC after decreasing the operation bandwidth and adjusting the center frequency.

6. The communications apparatus as claimed in claim 3, wherein the processor determines the switch timing according to a measurement gap pattern configured by the base station, and wherein the processor extends the operation bandwidth and adjusts the center frequency of the signal processing component at ending part of a measurement gap which is utilized for a measurement object.

7. The communications apparatus as claimed in claim 6, wherein the processor further decreases the operation bandwidth and adjusts the center frequency of the signal processing component after performing the deactivated secondary CC measurement by utilizing a starting part of a measurement gap, and the operation band of the signal processing component covers a bandwidth of the measurement object after decreasing the operation bandwidth and adjusting the center frequency.

8. A communications apparatus providing wireless communications services via a first Component Carrier (CC) configured by a base station in a wireless network, comprising:
an antenna module, comprising at least one antenna for receiving a plurality of Radio Frequency (RF) signals from the wireless network;
a signal processing device, coupled to the antenna module and comprising a plurality of signal processing components for processing the RF signals, wherein at least one signal processing component processes the RF signals according to an operation band defined by an operation bandwidth and a center frequency; and
a processor, coupled to the signal processing device, determining a switch timing for performing bandwidth extension and frequency adjustment required for performing a deactivated Secondary CC measurement, extending the operation bandwidth and adjusting the center frequency of the signal processing component at the switch timing, and performing the deactivated secondary CC measurement, wherein the operation band of the signal processing component covers both a bandwidth of the first CC and a bandwidth of the secondary CC after extending the operation bandwidth and adjusting the center frequency,
wherein the secondary CC is not able to perform data transmission or reception during a deactivated state, and
wherein the processor determines the switch timing according to a Channel Quality Indicator (CQI) reporting period, and wherein the processor further reports a predefined CQI value for indicating a wireless channel condition not suitable for communication to a base station in the wireless network, and extends the operation bandwidth and adjusts the center frequency of the signal processing component after reporting the predefined CQI value to the base station, wherein after the operation bandwidth and the center frequency adjustment is finished, a normal CQI value is reported for resuming communication based on realistic channel condition.

9. The communications apparatus as claimed in claim 8, wherein the processor further decreases the operation bandwidth and adjusts the center frequency of the signal processing component after reporting the predefined CQI value to the base station, and the operation band of the signal processing component covers only the bandwidth of the first CC after decreasing the operation bandwidth and adjusting the center frequency and reports the normal CQI value to resume communication based on realistic channel condition.

10. A method for deactivated secondary Component Carrier (CC) measurement in a communications apparatus providing wireless communications services via a first CC in a wireless network, comprising:
performing a Physical Downlink Control Channel (PDCCH) blind decoding in a sub-frame to obtain a PDCCH blind decoding result for the sub-frame;
determining a switch timing to perform bandwidth extension or frequency adjustment required for performing a deactivated secondary CC measurement according to the PDCCH blind decoding result;
extending an operation bandwidth or adjusting a center frequency of at least one signal processing component comprised in the communications apparatus at the switch timing, wherein an operation band defined by the operation bandwidth and the center frequency of the signal processing component covers at least a bandwidth of the secondary CC; and
performing the deactivated secondary CC measurement after extending the operation bandwidth or adjusting the center frequency,
wherein the secondary CC is not able to perform data transmission or reception during a deactivated state.

11. The method as claimed in claim 10, wherein the operation band of the signal processing component covers both a bandwidth of the first CC and the bandwidth of the secondary CC after extending the operation bandwidth or adjusting the center frequency.

12. The method as claimed in claim 10, wherein the step of extending the operation bandwidth or adjusting the center frequency of the signal processing component is performed when the PDCCH blind decoding result indicates that there is no downlink scheduling for the communications apparatus in the sub-frame.

13. The method as claimed in claim 12, further comprising:
decreasing the operation bandwidth or adjusting the center frequency of the signal processing component after performing the deactivated secondary CC measurement, wherein the operation band of the signal processing component covers only a bandwidth of the first CC after decreasing the operation bandwidth or adjusting the center frequency.

14. A method for deactivated secondary Component Carrier (CC) measurement in a communications apparatus providing wireless communications services via a first CC in a wireless network, comprising:
determining a switch timing to perform bandwidth extension or frequency adjustment required for performing a deactivated secondary CC measurement;
extending an operation bandwidth or adjusting a center frequency of at least one signal processing component comprised in the communications apparatus at the switch timing, wherein an operation band defined by the operation bandwidth and the center frequency of the signal processing component covers at least a bandwidth of the secondary CC; and
performing the deactivated secondary CC measurement after extending the operation bandwidth or adjusting the center frequency,
wherein the secondary CC is not able to perform data transmission or reception during a deactivated state,
wherein the switch timing is determined according to a Discontinuous Reception (DRX) cycle of the communications apparatus, and wherein the step of extending the operation bandwidth or adjusting the center frequency of the signal processing component is performed in a DRX off duration.

15. The method as claimed in claim 14, wherein the switch timing is determined according to a measurement gap pattern configured by a base station in the wireless network for measuring one or more measurement objects, and wherein the step of extending the operation bandwidth or adjusting the center frequency of the signal processing component is performed in a measurement gap not utilized for measuring any measurement object.

16. The communications apparatus as claimed in claim 15, further comprising:
decreasing the operation bandwidth or adjusting the center frequency of the signal processing component before an end of the measurement gap, wherein the operation band of the signal processing component covers only a bandwidth of the first CC after decreasing the operation bandwidth or adjusting the center frequency.

17. The method as claimed in claim 14, wherein the switch timing is determined according to a measurement gap pattern configured by a base station in the wireless network, and wherein the step of extending the operation bandwidth or adjusting the center frequency of the signal processing component is performed at an ending part of a measurement gap which is utilized for a measurement object.

18. The method as claimed in claim 17, further comprising:
decreasing the operation bandwidth or adjusting the center frequency of the signal processing component after performing the deactivated secondary CC measurement by utilizing a starting part of a measurement gap, wherein the operation band of the signal processing component covers a bandwidth of the measurement object after decreasing the operation bandwidth or adjusting the center frequency.

19. A method for deactivated secondary Component Carrier (CC) measurement in a communications apparatus providing wireless communications services via a first CC in a wireless network, comprising:
determining a switch timing to perform bandwidth extension or frequency adjustment required for performing a deactivated secondary CC measurement;
extending an operation bandwidth or adjusting a center frequency of at least one signal processing component comprised in the communications apparatus at the switch timing, wherein an operation band defined by the operation bandwidth and the center frequency of the signal processing component covers at least a bandwidth of the secondary CC; and
performing the deactivated secondary CC measurement after extending the operation bandwidth or adjusting the center frequency,
wherein the secondary CC is not able to perform data transmission or reception during a deactivated state, and
wherein the switch timing is determined according to a Channel Quality Indicator (CQI) reporting period, and the method further comprises:
reporting a predefined CQI value for indicating a wireless channel condition not suitable for communication to a base station in the wireless network; and
extending the operation bandwidth or adjusting the center frequency of the signal processing component after reporting the predefined CQI value to the base station,
wherein after the operation bandwidth or the center frequency adjustment is finished, a normal CQI value is reported for resuming communication based on realistic channel condition.

20. The method as claimed in claim 19, further comprising:
decreasing the operation bandwidth or adjusting the center frequency of the signal processing component after reporting the predefined CQI value to the base station, wherein the operation band of the signal processing component covers only a carrier frequency of the first CC after decreasing the operation bandwidth or adjusting the center frequency; and
reporting the normal CQI value to the base station to resume communication based on realistic channel condition.

* * * * *